US012793916B2

(12) United States Patent
Nikolic et al.

(10) Patent No.: US 12,793,916 B2
(45) Date of Patent: Nov. 10, 2026

(54) VACUUM INTERRUPTER, ASSEMBLY COMPRISING VACUUM INTERRUPTERS, AND METHOD FOR GRADING OR CONTROLLING A VOLTAGE DISTRIBUTION AMONG VACUUM INTERRUPTERS

(71) Applicant: Siemens Energy Global GmbH & Co. KG, Munich (DE)

(72) Inventors: Paul Gregor Nikolic, Erlangen (DE); Katrin Benkert, Schwaig (DE); Tobias Alexander Goebels, Issum (DE)

(73) Assignee: Siemens Global GmbH & Co. KG, Munich (DE)

( * ) Notice: Subject to any disclaimer, the term of this patent is extended or adjusted under 35 U.S.C. 154(b) by 326 days.

(21) Appl. No.: 18/291,394

(22) PCT Filed: Jun. 28, 2022

(86) PCT No.: PCT/EP2022/067726
§ 371 (c)(1),
(2) Date: Jan. 23, 2024

(87) PCT Pub. No.: WO2023/001505
PCT Pub. Date: Jan. 26, 2023

(65) Prior Publication Data

US 2024/0339275 A1 Oct. 10, 2024

(30) Foreign Application Priority Data

Jul. 23, 2021 (DE) ..................... 10 2021 207 962.8

(51) Int. Cl.
*H01H 33/662* (2006.01)
*H01H 33/664* (2006.01)

(52) U.S. Cl.
CPC .. *H01H 33/66261* (2013.01); *H01H 33/6647* (2013.01); *H01H 2033/6623* (2013.01); *H01H 2033/66276* (2013.01)

(58) Field of Classification Search
CPC ......... H01H 33/66261; H01H 33/6647; H01H 33/14; H01H 33/59; H01H 2033/6623;
(Continued)

(56) References Cited

U.S. PATENT DOCUMENTS 2,976,382 A * 3/1961 Lee ...................... H01H 33/664 361/135
4,434,332 A * 2/1984 Yanabu ................ H01H 33/143 218/144
(Continued)

FOREIGN PATENT DOCUMENTS

CN 112435889 A 3/2021
DE 102009031598 A1 1/2011
(Continued)

OTHER PUBLICATIONS

Translation of JPS 59-125039U (Original document published Aug. 23, 1984) (Year: 1984).*

*Primary Examiner* — William A Bolton
(74) *Attorney, Agent, or Firm* — Laurence A. Greenberg; Werner H. Stemer; Ralph E. Locher

(57) ABSTRACT

A vacuum interrupter for switching voltages, in particular high voltages, includes at least one envelope, at least one fixed contact, at least one movable contact, and control elements in particular having different lengths and/or widths disposed on the at least one vacuum interrupter. An assembly includes the vacuum interrupters electrically connected in series, in particular by control elements disposed on the at least two vacuum interrupters, and/or by control elements of one vacuum interrupter connected in series to control elements of another vacuum interrupter, in particular of all
(Continued)

vacuum interrupters. A method for grading or controlling voltage distribution among vacuum interrupters uses control elements, in particular capacitors and/or resistors, disposed on the vacuum interrupters, in particular in a housing along with the vacuum interrupters and/or along with control elements of different vacuum interrupters that are connected in series.

18 Claims, 5 Drawing Sheets

(58) Field of Classification Search
CPC .......... H01H 2033/66276; H01H 2033/66284; H02K 3/033
USPC ....... 218/134, 139, 138, 143–145, 155, 122, 218/118
See application file for complete search history.

(56) References Cited

U.S. PATENT DOCUMENTS

| | | | | |
|---|---|---|---|---|
| 7,239,492 | B2 * | 7/2007 | Heimbach | H01H 33/662 361/8 |
| 7,285,743 | B2 * | 10/2007 | Martin | H01H 33/027 218/138 |
| 8,426,760 | B2 * | 4/2013 | Holaus | H01H 33/16 218/78 |
| 8,847,097 | B2 | 9/2014 | Renz et al. | |
| 9,425,005 | B2 * | 8/2016 | Gentsch | H01H 33/66207 |
| 10,453,633 | B2 * | 10/2019 | Wang | H01H 33/66261 |
| 10,930,454 | B2 * | 2/2021 | Benkert | H01H 33/66261 |
| 11,456,133 | B2 | 9/2022 | Benkert et al. | |
| 2003/0141282 | A1 * | 7/2003 | Renz | H01H 33/66261 218/118 |
| 2009/0067108 | A1 * | 3/2009 | Kruesi | H01C 1/084 361/722 |
| 2020/0161065 | A1 * | 5/2020 | Djogo | H01H 33/14 |
| 2021/0327666 | A1 * | 10/2021 | Benkert | H01H 33/66261 |

FOREIGN PATENT DOCUMENTS

| | | | | |
|---|---|---|---|---|
| DE | 102013208419 | A1 | 11/2014 | |
| DE | 102018212853 | A1 | 2/2020 | |
| DE | 102019215309 | A1 | 4/2021 | |
| JP | S4517483 | Y1 | 7/1970 | |
| JP | S5151150 | U | 4/1976 | |
| JP | S52142658 | U | 10/1977 | |
| JP | S 59-125039 | U * | 8/1984 | H01H 33/66 |
| WO | WO 2020025407 | A1 | 2/2020 | |

* cited by examiner

VACUUM INTERRUPTER, ASSEMBLY COMPRISING VACUUM INTERRUPTERS, AND METHOD FOR GRADING OR CONTROLLING A VOLTAGE DISTRIBUTION AMONG VACUUM INTERRUPTERS

FIELD AND BACKGROUND OF THE INVENTION

The invention relates to a vacuum interrupter for switching voltages, comprising at least one envelope and comprising at least one fixed contact and comprising at least one movable contact. Furthermore, the invention comprises an assembly comprising above-described vacuum interrupters and a method for grading or controlling a voltage distribution among vacuum interrupters.

Vacuum interrupters or vacuum switches, which comprise assemblies of vacuum interrupters, are, for example, power switches in which switching contacts movable relative to one another are arranged in at least one vacuum switching chamber. In high-voltage technology, such vacuum interrupters are used for switching voltages in the high-voltage range, in particular greater than or equal to 52 kV, and/or for switching larger currents in the range up to several tens of kiloamps. Vacuum interrupters, in particular comprised by assemblies for switching, are low maintenance, long-lived, and driven easily and reliably in particular via spring-operated drives. For high-voltage requirements, for example, assemblies comprising multiple vacuum interrupters are used, the switching paths of which are electrically connected in series, as known, for example, from DE 10 2013 208 419 A1. Alternatively, for example, vacuum interrupters having multiple switching paths are used in particular in a vacuum interrupter.

In the case of multiple vacuum interrupters, with open switching paths of the vacuum interrupters, a voltage allocation on the vacuum interrupters which is adapted to the vacuum interrupters is desired, i.e., a voltage distribution, to avoid an overload of individual vacuum interrupters. In the case of vacuum interrupters having multiple switching paths in in particular one vacuum interrupter, with open switching paths of the vacuum interrupter, a voltage allocation or distribution of voltage adapted to the switching paths is desired to avoid an overload. For example, with multiple identically designed vacuum interrupters or switching paths connected one after another, the most uniform possible voltage allocation onto the vacuum interrupters or switching paths is desired.

In order to achieve a desired voltage allocation on the vacuum interrupters or switching paths, for example, passive electrical components such as a control resistor are connected in parallel to a vacuum interrupter. However, these components increase the installation space required for a vacuum switch having a vacuum interrupter or for an assembly having multiple vacuum interrupters. In particular in the case of a vacuum switch having purified and humidified compressed air, i.e., clean air as the insulating gas surrounding the vacuum interrupter, relatively large insulation distances are necessary between a vacuum interrupter and a passive electrical component and between a passive electrical component and a switch housing, which is metallic in particular, of the assembly of one or more vacuum interrupters, since the compressed air has a relatively low dielectric strength in comparison to other insulating gases, such as sulfur hexafluoride. To achieve sufficient insulation between the vacuum interrupters and switches having passive components, for example, it is possible to arrange the vacuum interrupters and interconnected passive components in different housings. However, these arrangements are associated with a high space requirement and high costs. A specific voltage allocation over individual elements of a vacuum interrupter is not possible using such a structure.

SUMMARY OF THE INVENTION

The invention is based on the object of enabling voltage control on a vacuum interrupter and/or an assembly comprising multiple vacuum interrupters with low space requirement and/or specifying a method for grading or controlling a voltage distribution among vacuum interrupters with low space requirement, in particular with a specific predetermined voltage allocation over individual elements of one or more vacuum interrupters.

The object is achieved according to the invention by a vacuum interrupter for switching voltages, an assembly comprising above-described vacuum interrupters, and/or a method for distributing a voltage among vacuum interrupters, in particular above-described vacuum interrupters. Advantageous embodiments of the vacuum interrupter according to the invention for switching voltages and/or the assembly according to the invention comprising above-described vacuum interrupters are specified in the dependent claims. Subjects of the main claim can be combined with features of dependent claims, and features of the dependent claims can be combined with one another.

A vacuum interrupter according to the invention for switching voltages comprises at least one envelope and at least one fixed contact and at least one movable contact. Furthermore, the vacuum interrupter comprises control elements which are arranged on the at least one vacuum interrupter. In particular, the control elements are arrangeable with the vacuum interrupter in a common housing and are not arranged in a separate housing from the vacuum interrupter.

The control elements enable a defined predetermined voltage allocation over the vacuum interrupter with open electrical contact, i.e., spaced-apart contacts of the vacuum interrupter. In particular, a uniform voltage allocation over the vacuum interrupter is possible, by which damage due to overvoltage can be avoided and a long-term-stable, reliable function of the vacuum interrupter can be ensured. The arrangement of the control elements on the at least one vacuum interrupter enables a compact, space-saving, cost-effective arrangement of the control elements and the at least one vacuum interrupter, in particular in a common housing, which is filled, for example, with clean air, with reduced risk of electrical flashover. A compact structure enables a material saving, in particular a small housing size, reduces costs, and enables the use of alternative switching gases such as clean air in compact assemblies, and makes a simple, environmentally friendly use of the vacuum interrupters possible.

The vacuum interrupter can comprise control elements of different lengths and/or different widths. One length is, for example, in the range of 10 to 100 mm, a second length is, for example, in the range of 20 to 200 mm, and/or a third length is, for example, in the range of 30 to 300 mm. The width of the control elements is, for example, in the range of 10 to 80 mm. Different circuits of the control elements having different values such as capacitance and/or ohmic resistance are thus possible, which enable predefined desired voltage allocations over areas of the vacuum interrupter.

The control elements can comprise at least one capacitor and/or at least one resistor, and/or at least one control element can be a capacitor and/or a resistor, and/or all control elements can consist of capacitors and/or resistors. In particular, control elements can consist of capacitors having different width and/or length and/or of resistors having different width and/or length, in particular of capacitors having different capacitance values and/or of resistors having different ohmic resistance values. The different values can also be produced, for example, by using different materials, in particular differently doped materials. The above-described advantages are associated therewith or can easily be enabled. Control elements are made, for example, of a ceramic-polymer composite material and/or can comprise a ceramic-polymer composite material, in particular in a cast resin matrix. Ceramic-polymer composite materials, in particular in a cast resin matrix, are well suitable for producing compact, cost-effective capacitors and/or resistors in different forms.

The vacuum interrupter can comprise an envelope having at least one main screen and having at least two ceramic segments, wherein the at least one main screen can be arranged between the at least two ceramic segments, and/or the control elements can be arranged on the envelope of the vacuum interrupter, in particular on the ceramic segments of the envelope, in particular in the immediate surroundings and/or applied directly materially bonded to the ceramic segments. A space-saving structure is thus enabled, having the above-described advantages, and an elevated electrical dielectric strength due to the electrically insulating properties of ceramic segments.

The ceramic segments can be divided into ceramic segment elements in particular by vapor screens, which protrude in particular from the interior of the vacuum interrupter into the outside area of the vacuum interrupter. At least one control element can protrude beyond more than one ceramic segment element with respect to length and/or can essentially have the length of two or more ceramic segment elements. Control elements having different values, such as capacitances and/or ohmic resistances, are thus implementable, having an interconnection of control elements via the vapor screens, which consist, for example, of copper and/or steel. Switching for distributing a voltage or voltage allocation over the vacuum interrupter in the state having open electrical contact or contacts which are spaced apart having different values of the control elements and via which vapor screens can be interconnected as desired, i.e., in a defined manner, is thus possible simply and cost-effectively. Overvoltages on individual ceramic segments and/or ceramic segment elements can be prevented, by which the service life of the vacuum interrupter is increased and a long-term-stable function is enabled, in particular without disturbances or even destruction due to overvoltages on ceramic segments.

At least two control elements can be comprised, in particular three or more control elements, which are arranged in a circle on the circumference of the at least one vacuum interrupter, in particular in a circle on the circumference of at least one ceramic segment element. A circular or annular arrangement of the control elements on ceramic segments and/or ceramic segment elements enables a compact, space-saving arrangement of the control elements and a simple, cost-effective interconnection of the control elements, in particular via the vapor screens, having the above-described advantages.

The control elements can be arranged in a circle on the circumference of the at least one vacuum interrupter, with respective control elements on different ceramic segment elements, wherein individual control elements can be arranged on precisely one ceramic segment element and/or individual control elements can be arranged on two and/or individual control elements can be arranged on more than two ceramic segment elements. Circuits comprising control elements of different values are thus possible, in particular different capacitance and/or ohmic resistance values, wherein control elements having equal length and width have, for example, equal values, and, by way of extension over two or more ceramic segment elements, can have smaller values, for example, in the case of capacitances, and/or greater values, for example, in the case of resistances, and a parallel connection of control elements of equal length can take place via an electrical interconnection via identical vapor screens in particular, and a series connection can take place via different vapor screens in particular lying in succession. A parallel connection of control elements interconnected in series with ceramic segment elements which are extended and protrude or are arranged over multiple ceramic segment elements is easily possible. In this way, arbitrary circuits of control elements having different values of control elements are possible easily and cost-effectively and in a space-saving manner. Desired, predefined distributions of voltage or voltage allocations over the vacuum interrupter are thus implementable, having the above-described advantages.

Control elements can be arranged electrically and/or spatially between the at least one fixed contact and the at least one movable contact, in particular between the at least one fixed contact and a vapor screen, and/or between at least one fixed contact and a main screen, and/or between a vapor screen and a main screen, and/or between two vapor screens, and/or between the at least one movable contact and a vapor screen, and/or between at least one movable contact and a main screen.

The arrangement of the control elements on the circumference of the vacuum interrupter, between the contacts, vapor screens, and/or main screen, enables a space-saving, compact arrangement, simple electrical contacting, for example, a uniform field distribution with uniform arrangement around the circumference of the vacuum interrupter, and/or an arbitrary, predetermined interconnection, and in particular, for example, a uniform, discrete allocation of the capacitances and/or ohmic resistances between the contacts, vapor screens, and/or main screen. A discrete allocation of the capacitances and/or ohmic resistances along the longitudinal axis and/or along the circumference of the vacuum interrupter is thus possible, and a deliberate or defined distribution of voltage or voltage allocation along the longitudinal axis and/or along the circumference of the vacuum interrupter, having the above-described advantages.

The control elements can have a total capacitance in the range of 10 to 4000 pF, in particular in the range of 500 to 4000 pF. These values enable a targeted or defined distribution of voltage or voltage allocation along the longitudinal axis and/or along the circumference of the vacuum interrupter, having a total value in particular for a distribution of voltage at high voltages in the range of greater than or equal to 52 kV. The vacuum interrupter can be designed to switch voltages in the high voltage range, in particular in the range greater than or equal to 52 kV.

In an assembly according to the invention comprising above-described vacuum interrupters, at least two, in particular more than two vacuum interrupters can be electrically connected in series, in particular using control elements which can be arranged on the at least two vacuum interrupters, and/or using control elements of one vacuum interrupter connected in series with control elements of a further vacuum interrupter, in particular all vacuum interrupters.

The switching of high voltage levels, in particular high voltages in the range of greater than or equal to 52 kV, can be carried out using cost-effective, available vacuum interrupters in this way. A voltage distribution as described above using control elements each along the circumference and/or the longitudinal axis of the vacuum interrupters, enables a voltage allocation on the vacuum interrupters and deliberate voltage distribution among the individual vacuum interrupters or vacuum interrupter elements, which are connected one behind another in series. The above-described advantages are thus achievable, in particular with a cost-effective, simple, space-saving, compact structure or arrangement.

A metal tank housing and/or an insulator housing can be comprised, in which the vacuum interrupters can be arranged, in particular filled with clean air as the insulating gas.

The compact arrangement of the control elements along the circumference and/or the longitudinal axis on the vacuum interrupter enables a compact metal tank housing and/or insulator housing, with low material and cost expenditure, reduces the risk of electrical flashover, reduces the insulating gas volume, and/or enables the use of climate-friendly or climate-neutral insulating gases such as clean air in compact, for example, cost-effectively available standard housings.

In a method according to the invention for grading or controlling a voltage distribution among vacuum interrupters, in particular above-described vacuum interrupters and/or above-described assemblies comprising vacuum interrupters, a distribution of electrical voltage takes place by means of control elements, in particular by means of capacitors and/or resistors, which are arranged on the vacuum interrupters, in particular in a housing with the vacuum interrupters, and/or with control elements of different vacuum interrupters which are connected in series.

The advantages of the method according to the invention for distributing a voltage among vacuum interrupters, in particular above-described vacuum interrupters and/or above-described assemblies comprising vacuum interrupters, and the advantages of the assembly according to the invention comprising above-described vacuum interrupters are analogous to the above-described advantages of the vacuum interrupter according to the invention for switching voltages and vice versa.

In the following, exemplary embodiments of the invention are schematically illustrated in the figures and described in more detail hereinafter.

DETAILED DESCRIPTION OF THE INVENTION

Figure 1:
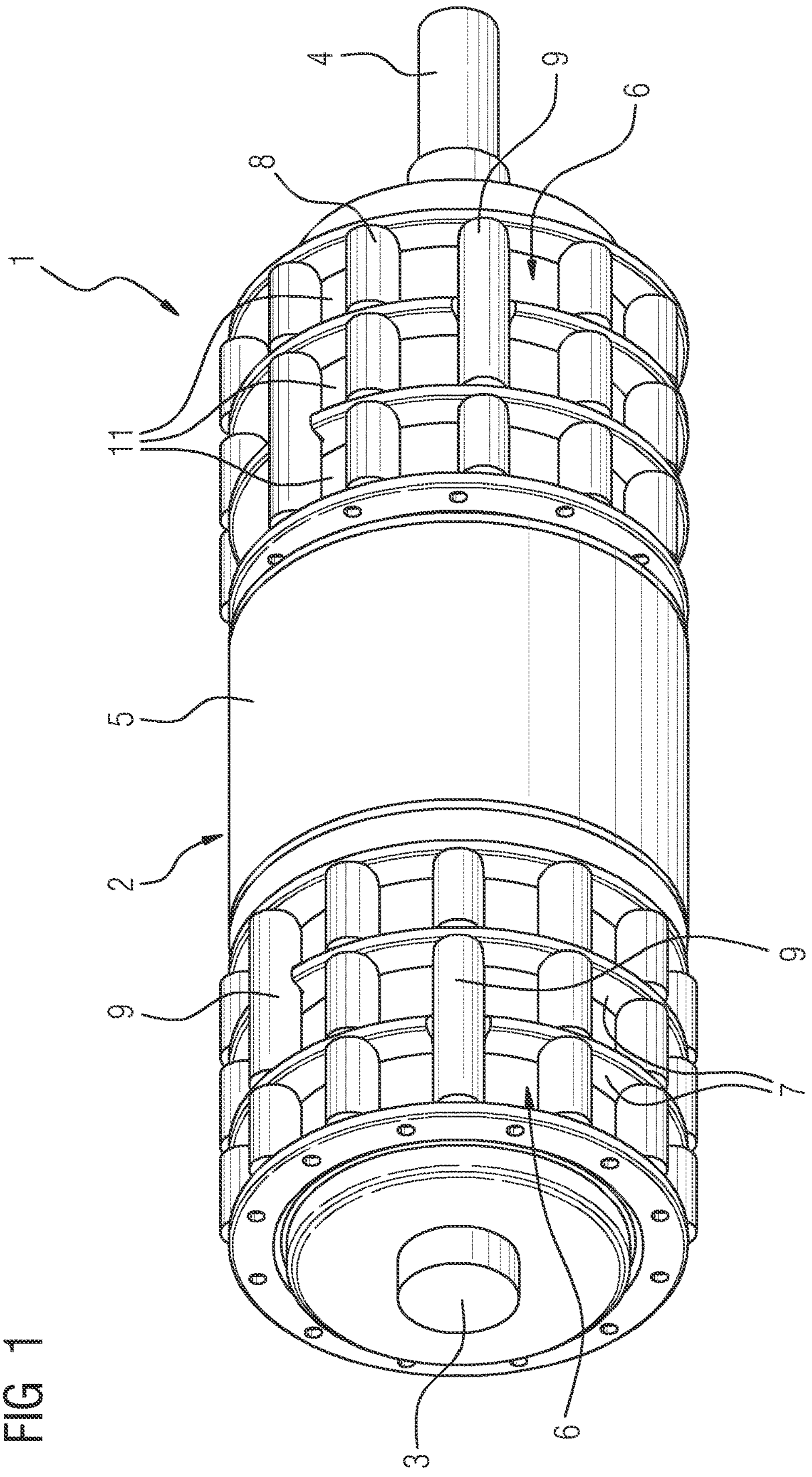
FIG. 1 schematically shows a vacuum interrupter 1 according to the invention for switching voltages in a diagonal view from the side, comprising control elements 8, 9 of different lengths arranged on an envelope 2 of the vacuum interrupter, and FIG. 2 schematically shows a vacuum interrupter 1 according to the invention analogous to the vacuum interrupter 1 of FIG. 1, comprising control elements 8, 9, 10, which have, for example, three different lengths, electrically contacted and interconnected between the contacts 3, 4 via vapor screens 7 and a main screen 5, and 9

FIG. 1 schematically shows a vacuum interrupter 1 according to the invention for switching voltages, in particular high voltages in the range greater than or equal to 52 kV, in a diagonal view from one side as an example. The vacuum interrupter 1 has an envelope 2, which comprises, inter alia, a middle main screen 5 and a ceramic segment 6 adjoining flush in each case on the right and left. The main screen 5 and the ceramic segments 6 are designed as hollow cylindrical or tubular and are each closed fluid tight at the ends of the vacuum interrupter 1. In the interior, the vacuum interrupter 1 is evacuated or a vacuum prevails. Contacts 3 and 4 protrude from the ends of the vacuum interrupter 1 into the envelope 2 of the vacuum interrupter 1, for example, a fixed contact 3 from one side or base surface of the cylinder and a movable contact 4 from the other side or top surface of the cylinder, i.e., the vacuum interrupter 1.

The main screen 5 is made, for example, of a metal, in particular copper and/or steel, and comprises, for example, vapor deposition screens in the interior, which are not shown for the sake of simplicity in the figures. The hollow cylindrical ceramic segments 6 are produced, for example, from sintered ceramic and in particular are surface treated. The ceramic segments 6 comprise, for example, ceramic segment elements 11, which are connected to one another via vapor screens 7. A connection is carried out here, for example, during a soldering process in a furnace at several hundred degrees Celsius during the production of the vacuum interrupter 1. The vapor screens 7 are made, for example, of metal, in particular copper and/or steel, and are designed as annular. In the interior of the vacuum interrupter 1, the vapor screens 7 comprise, for example, vapor deposition screens, which are not shown in the figures for the sake of simplicity. The vapor screens 7 protrude drawn outward, for example, in the form of flat rings out of the vacuum interrupter 1 or beyond the ceramic segment element 11 circumference. The vapor screens 7 divide a respective ceramic segment 6 into ceramic segment elements 11.

The contacts 3 and 4 are made, for example, of copper and/or steel and in particular are designed as bolt-shaped, having, for example, slotted, plate-shaped ends in the interior of the vacuum interrupter 1. The fixed contact 3 is connected fluid tight to a cover-shaped closure on one end of the vacuum interrupter 1, wherein the closure is produced, for example, from a metal, in particular copper and/or steel. The movable contact 4 is connected fluid-tight to a cover-shaped closure on the other end of the vacuum interrupter 1, for example, movably mounted via a folded bellows, which is not shown for the sake of simplicity in FIG. 1, wherein the closure is produced, for example, from a metal, in particular copper or steel.

The vacuum interrupter can be electrically contacted via the bolts of the fixed contact 3 led outward and the movable contact 4. The movable contact 4 enables electrical switching by moving toward the fixed contact 3, i.e., to close a gap between the plate-shaped contact ends of the contacts 3 and 4, upon switching on, and by moving away from the fixed contact 3, i.e., to create a gap between the plate-shaped contact ends of the contacts 3 and 4, upon switching off. The gap created between the contact ends of the contacts 3 and 4 and the contact ends themselves are arranged in the evacuated interior of the vacuum interrupter 1, due to which a gap in the range of millimeters up to centimeters is sufficient for switching high voltages in particular. The vacuum interrupter 1 has, for example, a length in the range of in particular 30 to 100 cm, and a circumference in the range of in particular 10 to 100 cm.

Figure 2:
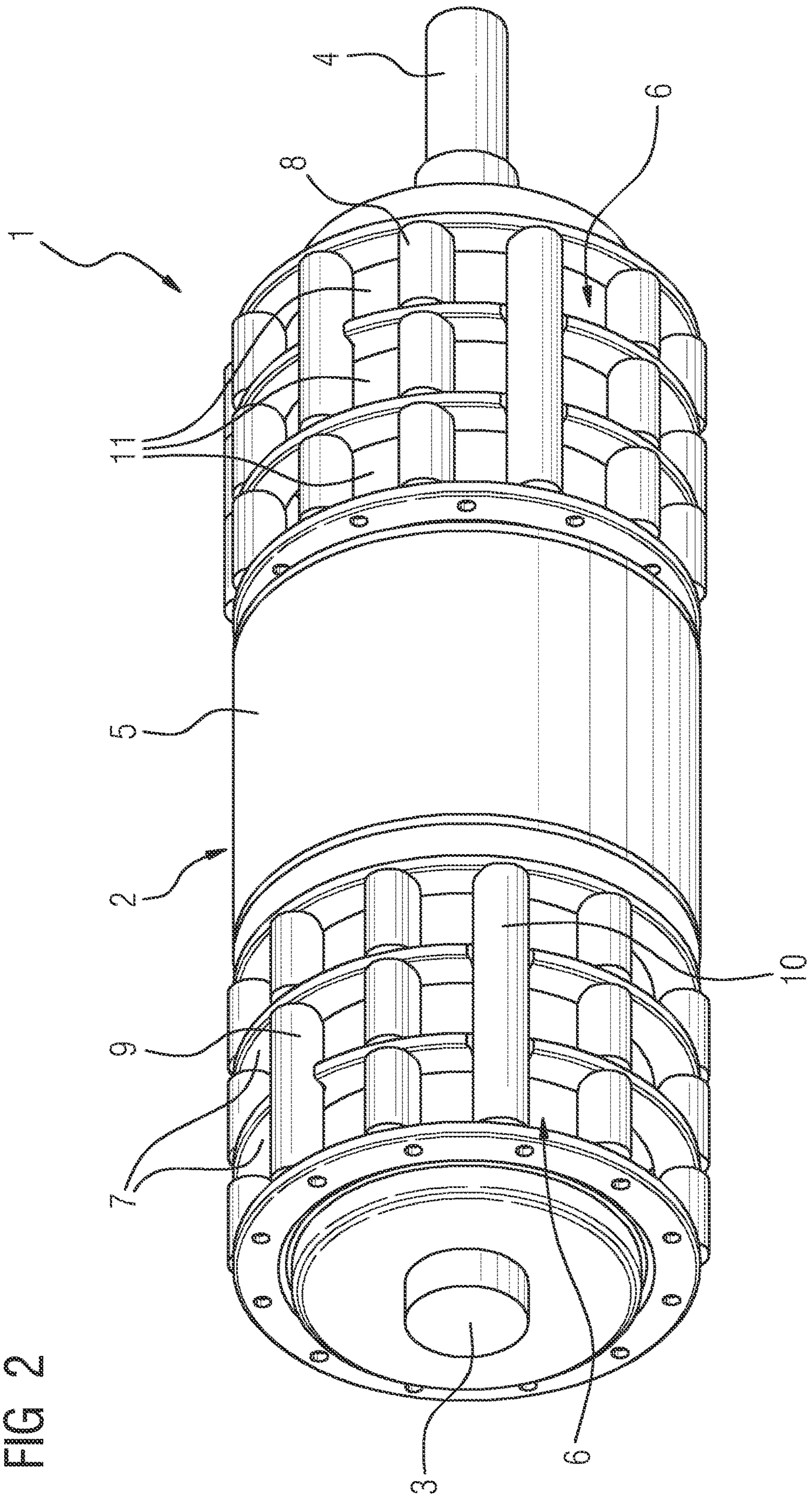

According to the invention, control elements 8, 9, 10 are arranged around the circumference of the vacuum interrupter 1 on an envelope 2 of the vacuum interrupter 1, as shown in FIGS. 1 and 2. Control elements 8, 9, 10 are, for example, capacitors and/or resistors. Capacitors are in particular ceramic capacitors, for example, having values of the capacitance of individual capacitors in the range of 10 to 4000 pF. A total capacitance of the assembly thus results, for example, in the range of 10 to 4000 pF. Resistors are in particular ohmic resistors, for example, having values of individual resistors in the range of a few ohms up to several hundred, or several thousand, or several tens of thousands of ohms, or several hundreds of thousands of ohms. A total resistance therefore results in the range of a few ohms up to several hundred ohms, several thousand ohms, several tens of thousands of ohms, or several hundreds of thousands of ohms.

The control elements 8, 9, 10 have, for example, a cylindrical, rectangular, and/or elliptical shape. Other shapes which permit, for example, a space-saving arrangement, for example, having convex and/or concave surfaces, are also possible. An arrangement of the control elements 8, 9, 10 around the circumference of the envelope 2 of the vacuum interrupter 1 is carried out, for example, in a circle along the cross section of the circumference. Control elements 8, 9, 10 are designed, for example, having different lengths and/or widths, to implement control elements 8, 9, 10 having different values, for example, of the capacitance and/or the ohmic resistance. The length 1 is, for example, in the range of 10 to 100 mm, in the range of 20 to 200 mm, and/or in the range of 30 to 300 mm. The width is, for example, in the range of 10 to 80 mm. In FIG. 1, control elements 8 having a length equal to the length of a ceramic segment element 11 are shown arranged parallel to the longitudinal axis of the vacuum interrupter 1, which are designated hereinafter as short control elements 8. The control elements 8 of a ceramic segment element 11 are in particular interconnected in parallel to one another and, electrically connected to one another or interconnected via vapor screens 7 following one another along the longitudinal axis of the vacuum interrupter 1. The short control elements 8 are arranged, for example, at regular and/or equal distances from one another along the circumference of a respective ceramic segment element 11 and/or a circular cross section of the vacuum interrupter 1 and interconnected in parallel. Along the longitudinal axis of the vacuum interrupter 1, control elements 8 are electrically interconnected in series, arranged on different ceramic segment elements 11 and/or ceramic segments 6 and/or vacuum interrupters 1, as explained in more detail in the following exemplary embodiments.

Control elements 9 having a length equal to the length of two ceramic segment elements 11 are arranged parallel to the longitudinal axis of the vacuum interrupter 1 and are designated hereinafter as medium-length control elements 9. The control elements 9 are interconnected in parallel to one another with control elements 8, 9 of the same two ceramic segment elements 11, wherein two control elements 8 connected in series are each connected in parallel to control elements 9, and the interconnection or electrical connection takes place via three vapor screens 7 following one another along the longitudinal axis of the vacuum tube 1, wherein at points of the control elements 9, the middle vapor screen 7 has a recess or depression and is not electrically connected to the control elements 9. The short and medium-length control elements 8, 9 are arranged, for example, at regular and/or equal distances from one another along the circumference of a respective ceramic segment element 11 and/or two ceramic segment elements 11 or a circular cross section of the vacuum interrupter 1, for a parallel interconnection with the control elements 9. Along the longitudinal axis of the vacuum interrupter 1, electrically interconnected in series, control elements 8, 9 are arranged on different ceramic segment elements 11, or for control elements 9 on different ceramic segment element pairs, and/or ceramic segments 6 and/or vacuum interrupters 1, as also explained in more detail in the following exemplary embodiments.

As shown by way of example in FIG. 2, control elements 8, 9, 10 having three different lengths are also usable, or having more length differences, which is not shown for the sake of simplicity in the figures. In FIG. 2, additional control elements 10 having a length equal to the length of three ceramic segment elements 11 are shown, which are designated hereinafter as long control elements 10. A arrangement and interconnection takes place similarly to the short and medium-length control elements 8, 9, arranged and interconnected parallel to the longitudinal axis of the vacuum interrupter 1, and along the longitudinal direction of the vacuum interrupter in series connection and along a 8 cross 9 section f the vacuum interrupter in parallel connection. Further possibilities for the arrangement and lengths are possible, for example, an arrangement along helical lines and/or diagonally and the use of control elements 8, 9, 10 having different widths in order to implement different values, for example, of the capacitance and/or the ohmic resistance, which is not shown for the sake of simplicity in the figures.

As shown in FIGS. 1 and 2, the control elements 8, 9, 10 are arranged, for example, along the circumference of the envelope 2 of the vacuum interrupter 1 electrically and spatially spaced apart on a circular cross section of the circumference of the vacuum interrupter 1, along the longitudinal axis of the vacuum interrupter 1 between the fixed contact 3 and the movable contact 4, in particular between the fixed contact 3 and a vapor screen 7, between adjacent vapor screens 7, between a vapor screen 7 and the main screen 5, between the main screen 5 and a vapor screen 7, between adjacent vapor screens 7, between a vapor screen 7 and the movable contact 4, in particular arranged symmetrically. The vapor screens 7 and the main screen 5 are used for the good electrically conductive contacting of the control elements 8, 9, 10 among one another and between or with the contacts 5 and 6, for example, via the cover-shaped closures at the ends of the vacuum interrupter 1, and in particular in the case of the movable contact 4 via the folded bellows. At points of control elements 9, 10 which protrude beyond vapor screens 7 or pass over or overlap multiple ceramic segment elements 11 which are connected by the vapor screen 7 or the vapor screens 7, for example, recesses and/or depressions are arranged in the vapor screen 7 or the respective vapor screens 7 in order to prevent an electrical contact of the respective vapor screens 7 with the respective protruding control elements 9, 10.

Vapor screens 7 are made, for example, of a metal, in particular copper and/or steel, and can divide ceramic segments 6 via vapor deposition screens in particular, which protrude into the vacuum interrupter 1. A connection of the elements of the vacuum interrupter 1, such as ceramic segments 6, main screen 5, vapor screens 7, cover-shaped closures, and/or to control elements 8, 9, 10 is carried out, for example, by soldering and/or conductive adhesive bonding. An arrangement of the control elements 8, 9, 10 on the vacuum interrupter 1 or the envelope 2 of the vacuum interrupter 1 comprises a materially-bonded mechanical contact with the envelope and/or a 2 small distance in the range of millimeters, wherein a direct contact of the control elements 8, 9, 10 with the envelope can take place, for example, via the vapor screens 7, the main screen 5, and/or the cover-shaped closures.

Control elements 8, 9, 10 contacted between different vapor screens 7 are arranged, for example, along the longitudinal axis of the vacuum interrupter 1 on lines parallel to the longitudinal axis, which are in particular straight or curved, or are each arranged offset in relation to one another. The arrangement of the control elements 8, 9, 10 on the circumference of the vacuum interrupter 1 results, for example, in regular or irregular patterns. An arrangement of the control elements 8, 9, 10 on the circumference of the vacuum interrupter 1 or its envelope 2 is space-saving, with minimized cross section.

Figure 3:
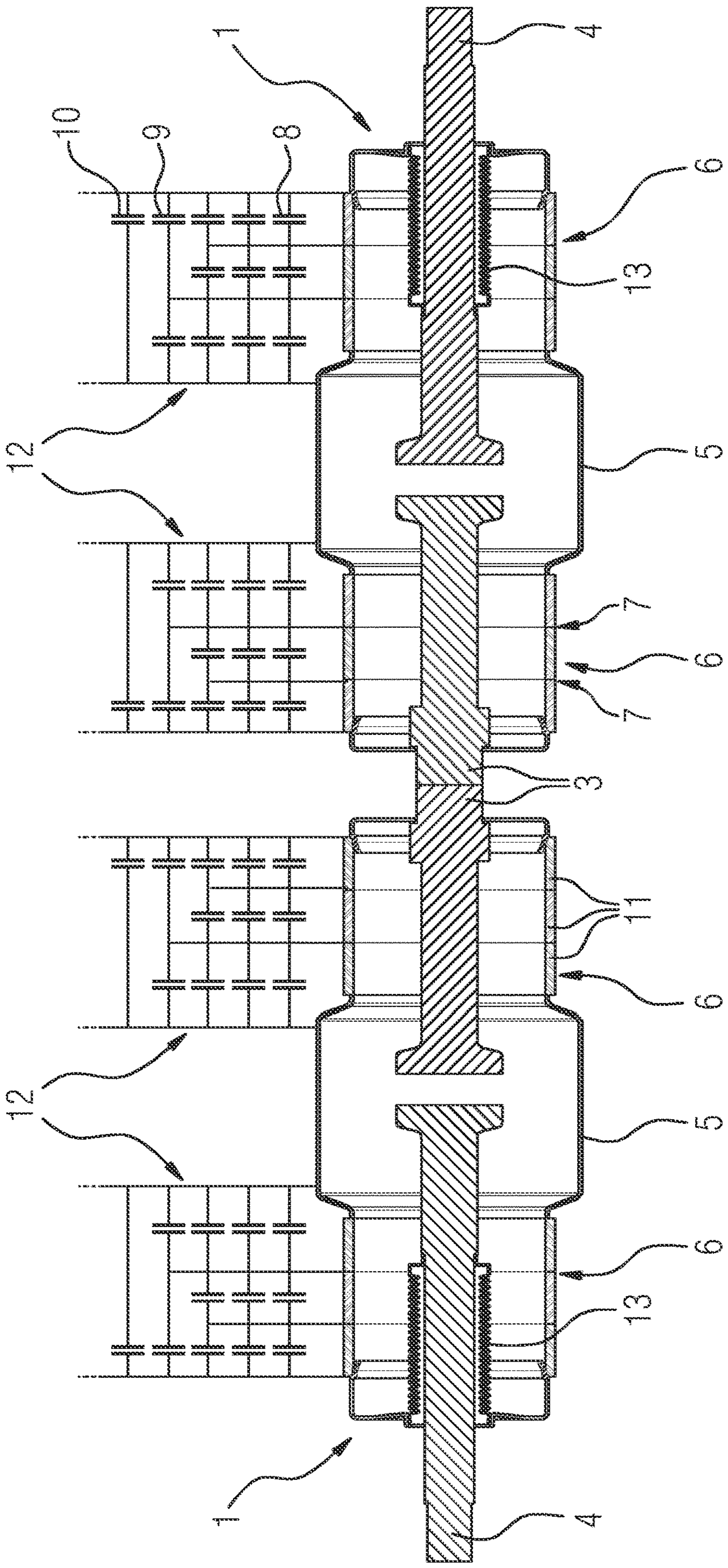
FIG. 3 shows an assembly 16 according to the invention of two vacuum interrupters 1 of FIG. 2 connected in series, with schematically illustrated interconnection of the control elements 8, 9, 10 in each case vacuum interrupter 1 per interconnected between the contacts 3, 4 via vapor screens 7 and the main screens 5.

FIG. 3 shows two vacuum interrupters 1 according to the invention of FIGS. 1 and/or 2 arranged in series one behind the other, according to an assembly 16 according to the invention of vacuum interrupters 1, with schematically shown interconnection of the control elements 8, 9, 10. The interconnection of the control elements 8, 9, 10, i.e., electrical contacting and connecting, takes place per vacuum interrupter 1 in each case between the contacts 3, 4 via the vapor screens 7 and the main screen 5. Different circuits are possible here, according to the desired predefined voltage distribution or distribution of voltage among the vacuum 8 interrupters 1. Symmetrical circuits can be used in particular for uniform voltage distribution among the vacuum interrupters 1, or different circuits can be used beyond the ceramic segments 6, which is not shown for the sake of simplicity in the figures. For example, a series circuit of two vacuum interrupters 1, having a total of four ceramic segments 6, which are each divided by two vapor screens 7 into three ceramic segment elements 11, is shown in FIG. 3.

The exemplary embodiment of FIG. 3 schematically shows that the two vacuum interrupters 1 are each equipped with identical control element 8, 9, 10 circuits, wherein two symmetrical partial circuits reflected at the main screen 5, via which two ceramic segments 6 are connected, are used per vacuum interrupter 1. Three times three short control elements 8 are connected in series per ceramic segment 6 here, wherein the three control elements 8 connected in series are each connected in parallel to the other two times three control elements 8, wherein all control elements 8 are electrically connected in each case via the vapor screens 7 between the contacts 3 or 4 and the main screen 5. A long control element 10 is connected in parallel for this purpose. Furthermore, a medium-length control element 9 and a short control element 8, which are connected in series, are connected in parallel to the long control element 10. The short control element 8 is connected in parallel in each case to one of the three control elements 8 connected in series. The circuit is shown by way of example in FIG. 3 and can also be constructed differently in accordance with a desired voltage distribution. Only capacitances in the form of capacitors are used as control elements 8, 9, 10 in FIG. 3. Additionally or alternatively, ohmic resistors can also be used.

Figure 4:
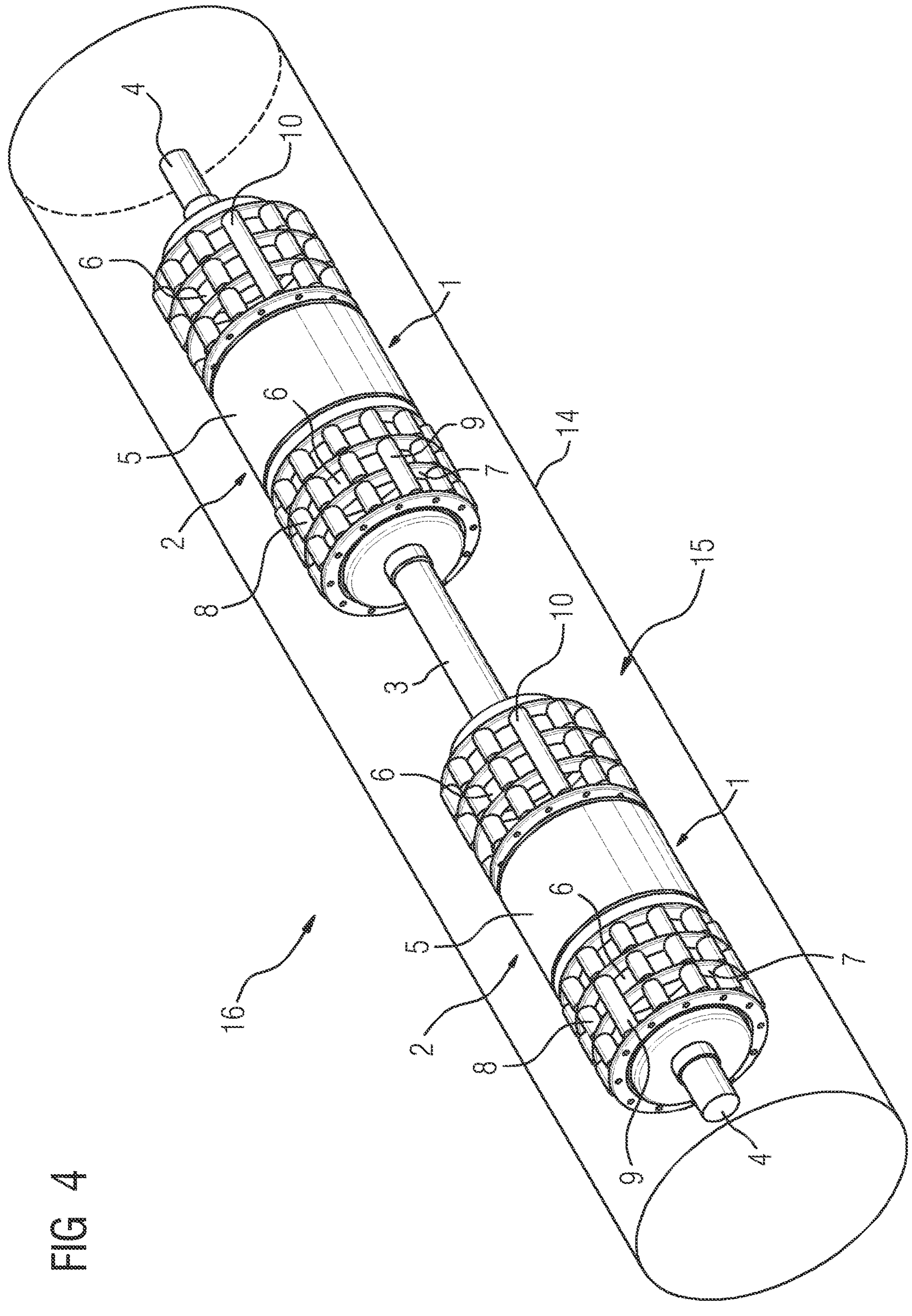
FIG. 4 shows an assembly 16 according to the invention of two vacuum interrupters 1 analogous to FIG. 3 connected in series, which are enclosed by a housing 14 that is filled, for example, with clean air as an insulating gas 15.

FIG. 4 shows an assembly 16 according to the invention of two vacuum interrupters 1 connected in series analogous to FIG. 3, wherein the vacuum interrupters 1 are enclosed by a housing 14 or are arranged in a housing 14. The housing 14 is, for example, a gas tight sealed metal tank housing and/or a gas tight sealed insulator housing. Metal tank housings are made, for example, of steel or aluminum, in particular at 11 ground potential in the manner of a dead tank. Insulator housings are made, for example, of ceramic, silicone, and/or composite materials, in particular having a ribbed outer surface to extend leakage current paths. The housing 14 is filled, for example, with clean-air as an insulating gas 15, which is climate-neutral. Alternatively or additionally, insulating gases 15 such as $SF_6$ and/or $CO_2$ can be used.

The vacuum interrupters 1, as shown in FIG. 4, are connected to one another via the fixed contacts 3, in particular directly connected. Alternatively, the vacuum interrupters 1 can be connected to one another via the movable contacts 4, in particular electrically and mechanically, or a connection takes place via a movable contact piece 4 and a fixed contact piece 3. A drive, for example a motor-operated drive and/or spring-operated drive, is provided, for example, to drive the movable contacts 4 during the electrical switching, which is not shown in the figures for the sake of simplicity.

Figure 5:
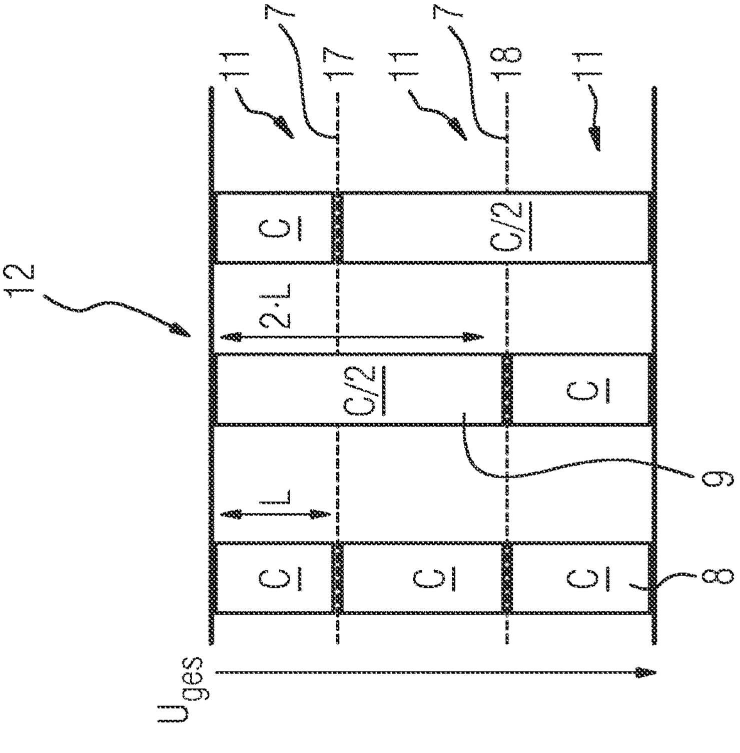
FIG. 5 shows a schematic illustration of a voltage allocation of the electrical potential $U_{ges}$ applied to a ceramic segment 6 of a vacuum interrupter 1, divided by vapor screens 7 having vapor screen potentials 17 and 18 into ceramic segment elements 11, over different interconnected capacitors as control elements 8, 9.

FIG. 5 shows by way of example a schematic illustration of a voltage allocation and arrangement or interconnection of capacitors as the control elements 8, 9, 10, of a ceramic segment 6 of a vacuum interrupter 1 analogous to FIGS. 1 and 2. The ceramic segment 6 is divided here into three ceramic segment elements 11 by two vapor screens 7. In contrast to the circuits of FIGS. 1 and 2, three short control elements 8 are connected in series for the sake of simplicity in FIG. 5, with a medium-length control element 9 connected in parallel to two of the three control elements 8 connected in series, and a short control element 8 connected in parallel to the third of the three control elements 8 connected in series. For this purpose, in reverse order a short control element 8 is connected in parallel to the first of the three control elements 8 connected in series, and a medium-length control element 9 is connected in parallel to the two other of the three control elements 8 connected in series, wherein the middle control element 9 is connected in series to the short control element 8, and in parallel to the first of the three control elements 8 connected in series.

An electrical potential or an electrical overall voltage $U_{ges}$ is applied via the ceramic segment 6, which is divided by the two vapor screens 7 into three ceramic segment elements 11, or drops across it, which is designated hereinafter as the chamber potential, which generates a first vapor screen potential 17 and a second vapor screen potential 18 by the interconnection with the aid of the control elements 8, 9 at the vapor screens 8.

Figure 6:
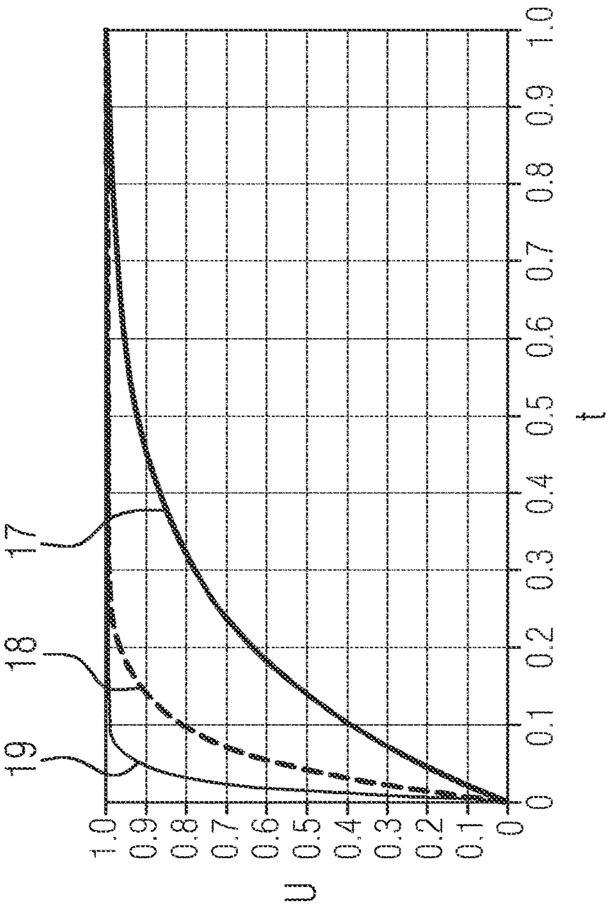
FIG. 6 shows a scaled potential curve U as a function of the time t for a first vapor screen potential 17, a second vapor screen potential 18, and a chamber potential 19.

In FIG. 6, scaled potential curves U, as a function of the time T, are shown in each case for a chamber potential 19, a first vapor screen potential 17, and a second vapor screen potential 18, for a ceramic segment 6 interconnected according to FIG. 5. The chamber potential 19 shows the strongest increase before the potential 19 goes into saturation, and the vapor screen potential 17 shows the least increase. The potential curve of the vapor screen potential is in between. Both vapor screen potential curves 17 and 18 are below the chamber potential 19, by which an excessive voltage increase at the vapor screens 7 can be prevented. Excessive voltage increases reduce the long-lived nature of the vacuum interrupters and can result in destruction and disturbances during switching. An interconnection shown in FIGS. 1 to 5 enables a reliable, long-term-stable function of the vacuum interrupters 1 and/or the assemblies having vacuum interrupters 16, without disturbances, which saves costs, in particular maintenance costs and restoration costs, and time.

The above-described exemplary embodiments can be combined with one another and/or can be combined with the prior art. Thus, for example, more than two vacuum interrupters 1 can be mutually interconnected, in particular in series and/or in parallel. The control elements 8, 9, 10 can have different shapes, in particular circular-cylindrical, or cylindrical with elliptical base surface and top surface, rectangular, square, and/or shapes having convex and/or concave surface. The control elements 8 are fastened, for example, on the vacuum interrupter 1 by soldering, in particular on metal parts such as copper parts, by screws, by adhesive bonding, by clamping, and/or by welding. The control elements 8, 9, 10 are arranged, for example, directly in a friction-locked manner on the envelope 2, in particular on ceramic segments 6, in particular electrically insulated from the ceramic segment 6 by an insulating paint and/or a surface treatment. And/or control elements 8, 9, 10 are arranged, for example, directly on the envelope 2, in particular on ceramic segments 6, at a slight distance from the ceramic segments 6, in particular between the vapor screens 7, main screen 5, and/or contacts 3, 4, for example, connected by screws, clamped, soldered, adhesively bonded, and/or welded. A small distance is, for example, in the range of a few millimeters up to one centimeter.

The control elements 8, 9, 10 are arranged, for example, on the envelope 2 of the vacuum interrupter 1 or vacuum interrupters 1 as discrete components, in particular spaced apart from one another. In this case, an arrangement is, for example, annular, along a, for example, circular cross section of the vacuum interrupter 1, having different rings along the longitudinal axis of the vacuum interrupter 1. Adjacent control elements 8, 9, 10 in different rings are arranged, for example, on straight lines, or offset to one another. Alternatively, the control elements 8, 9, 10 can be arranged, for example, on a helical line or spiral. Further arrangements and/or combinations of arrangements are also possible.

Using the above-described vacuum interrupter 1 according to the invention and the assembly 16 of vacuum interrupters 1 according to the invention in series one behind another, in particular interconnected in series, it is possible to distribute voltages among the vacuum interrupters 1 via the control elements 8. Voltages can be allocated uniformly or differently, in a predetermined manner via the selection of the control elements 8, 9, 10 and the interconnection thereof on the vacuum interrupters 1 or the elements thereof, such as ceramic segments 6 and/or ceramic segment elements 11 of different lengths. The arrangement of the control elements 8, 9, 10 on the vacuum interrupter 1 or the vacuum interrupters 1 enables a compact, space-saving structure, which enables a cost-effective, spatially minimized housing 14, and in particular enables the use of insulating gases, such as clean air, with small or minimized and/or standard dimensions of housings. The distribution of the voltage among the vacuum interrupter 1 or vacuum interrupters 1, with the aid of the control elements 8, 9, 10 and the interconnection thereof, prevents excessive voltages and damage or even destruction of the vacuum interrupter 1 and/or assembly 16 comprising vacuum interrupters 1 in the case of open contact or contacts 3, 4 spaced apart from one another. Arbitrary, desired voltage distributions are possible by way of different circuits, in particular upon the use of capacitors and/or resistors of different sizes, in particular length and/or width.

LIST OF REFERENCE SIGNS

1 vacuum interrupter
2 envelope
3 fixed contact
4 movable contact
5 main screen
6 ceramic segment
7 vapor screen
8 short control element
9 medium-length control element
10 long control element
11 ceramic segment element
12 circuit diagram of the control elements
13 folded bellows
14 housing
15 insulating gas
16 assembly comprising vacuum interrupters
17 first vapor screen potential
18 second vapor screen potential
19 chamber potential
t time
U electrical potential

The invention claimed is:

1. A vacuum interrupter for switching voltages, the vacuum interrupter comprising:
- at least one envelope;
- at least one fixed contact;
- at least one movable contact; and
- control elements disposed on the vacuum interrupter, said control elements being discrete components disposed spaced apart on said at least one envelope and said control elements having at least one of different lengths or different widths.

2. The vacuum interrupter according to claim 1, wherein at least one of:
- said control elements include at least one of at least one capacitor or at least one resistor, or
- at least one of said control elements is at least one of a capacitor or a resistor, or
- all of said control elements are formed of at least one of capacitors or resistors, or
- all of said control elements are formed of at least one of capacitors having different widths or lengths or at least one of resistors having at least one of different widths or lengths, or
- all of said control elements are formed of at least one of capacitors having different capacitance values or resistors having different ohmic resistance values.

3. The vacuum interrupter according to claim 1, wherein:
- said at least one envelope has at least one main screen and at least two ceramic segments; and at least one of:
  - said at least one main screen is disposed between said at least two ceramic segments, or said control elements are disposed on said at least one envelope or on said at least two ceramic segments or said control elements are at least one of in immediate surroundings of or applied directly materially bonded to said at least two ceramic segments.

4. The vacuum interrupter according to claim 3, wherein at least one of:

said at least two ceramic segments are divided into ceramic segment elements, or at least one of said control elements at least one of protrudes beyond more than one of said ceramic segment elements with respect to length or has substantially a length of two or more of said ceramic segment elements.

5. The vacuum interrupter according to claim 4, which further comprises vapor screens dividing said at least two ceramic segments into said ceramic segment elements, said vapor screens protruding from an interior of the vacuum interrupter into an outside area of the vacuum interrupter.

6. The vacuum interrupter according to claim 1, wherein said control elements include at least two, three or more control elements disposed in a circle along a circumference of at least one vacuum interrupter.

7. The vacuum interrupter according to claim 1, wherein said at least two ceramic segments are divided into ceramic segment elements, and said control elements are disposed in a circle along a circumference of at least one of said ceramic segment elements.

8. The vacuum interrupter according to claim 1, wherein:

said control elements are disposed in a circle along a circumference of at least one vacuum interrupter, and at least one of:

said control elements are each disposed on a different respective one of said ceramic segment elements, or individual control elements are each disposed on precisely one respective ceramic segment element, or individual control elements are each disposed on two of said ceramic segment elements, or individual control elements are disposed on more than two of said ceramic segment elements.

9. The vacuum interrupter according to claim 1, which further comprises:

a main screen and vapor screens;

said control elements being:

at least one of electrically or spatially disposed between said at least one fixed contact and said at least one movable contact, or between said at least one fixed contact and one of said vapor screens, or between said at least one fixed contact and said main screen, or between one of said vapor screens and said main screen, or between two of said vapor screens, or between said at least one movable contact and one of said vapor screens, or between said at least one movable contact and said main screen.

10. The vacuum interrupter according to claim 1, wherein said control elements have a total capacitance in a range of 10 to 4000 pF.

11. The vacuum interrupter according to claim 1, wherein said control elements have a total capacitance in a range of 500 to 4000 pF.

12. The vacuum interrupter according to claim 1, wherein the vacuum interrupter is configured to switch voltages in a high-voltage range.

13. The vacuum interrupter according to claim 1, wherein the vacuum interrupter is configured to switch voltages in a range greater than or equal to 52 kV.

14. An assembly, comprising:

at least two or more vacuum interrupters according to claim 1 being electrically connected in series by at least one of:

said control elements being disposed on the at least two vacuum interrupters, or said control elements of one of the vacuum interrupters being connected in series with said control elements of a further one of the vacuum interrupters or of all of the vacuum interrupters.

15. The assembly according to claim 14, which further comprises at least one of a metal tank housing or an insulator housing in which the vacuum interrupters are disposed.

16. The assembly according to claim 14, which further comprises clean air filling said housing as an insulating gas.

17. A method for grading or controlling a voltage distribution among vacuum interrupters, the method comprising:

providing two vacuum interrupters each according to claim 1 and using the control elements to grade or control the voltage.

18. The method according to claim 17, which further comprises:

providing the control elements as at least one of capacitors or resistors disposed on the vacuum interrupters; and at least one of:

placing the control elements and the vacuum interrupters in a housing, or connecting control elements of different vacuum interrupters in series.

* * * * *